United States Patent [19]

Maeda

[11] Patent Number: 5,761,923
[45] Date of Patent: Jun. 9, 1998

[54] AIR CONDITIONING SYSTEM

[75] Inventor: Kensaku Maeda, Fujisawa, Japan

[73] Assignee: Ebara Corporation, Tokyo, Japan

[21] Appl. No.: 781,038

[22] Filed: Jan. 9, 1997

[30] Foreign Application Priority Data

Jan. 12, 1996 [JP] Japan ................................ 8-022133
Jul. 12, 1996 [JP] Japan ................................ 8-203156

[51] Int. Cl.$^6$ ........................... F25B 47/00; F25D 17/02
[52] U.S. Cl. .................................... 62/271; 62/510
[58] Field of Search ........................... 62/94, 271, 510

[56] References Cited

U.S. PATENT DOCUMENTS

| | | | |
|---|---|---|---|
| 2,700,537 | 1/1955 | Pennington | 261/83 |
| 4,430,864 | 2/1984 | Mathiprakasam | 62/94 |
| 4,887,438 | 12/1989 | Meckler | 62/94 |
| 5,325,676 | 7/1994 | Meckler | 62/93 |
| 5,448,895 | 9/1995 | Coellner et al. | 62/94 |
| 5,551,245 | 9/1996 | Calton et al. | 62/271 X |
| 5,564,281 | 10/1996 | Calton et al. | 62/271 X |

*Primary Examiner*—William E. Wayner
*Attorney, Agent, or Firm*—Armstrong, Westerman, Hattori, McLeland & Naughton

[57] ABSTRACT

A highly reliable air conditioning system which can be operated by commonly available compressors and produce a higher energy utilization efficiency in desiccant assisted air conditioning process while offering an economical cost of purchase as well as operation is disclosed. The air conditioning system is made by combining a desiccant assisted air conditioner with a plurality of vapor compression refrigeration circulation units, each unit having a compressor, an evaporator and a condenser. The circulation units are arranged so that the evaporators and the condensers are disposed in a last-come-first manner in relation to an order between a process air passage and a regeneration air passage.

8 Claims, 7 Drawing Sheets

F I G. 4
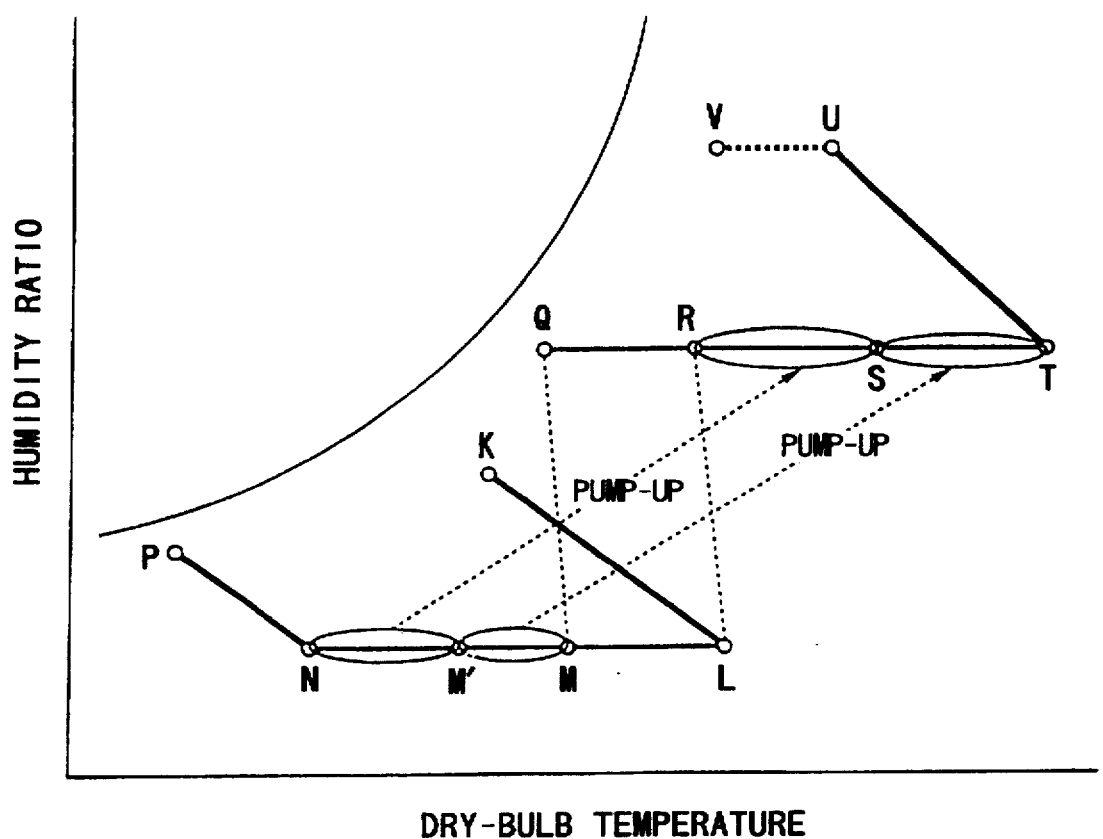

1

AIR CONDITIONING SYSTEM

BACKGROUND OF THE INVENTION

1. Field of the Invention

The present invention relates in general to air conditioning systems, and relates in particular to a desiccant assisted air conditioning system comprising a vapor compression heat pump or vapor compression refrigerating machine for regeneration of desiccant and cooling of process air.

2. Description of the Related Art

Desiccant assisted air conditioning apparatus is well known, for example in a U.S. Pat. No. 2,700,537. The system discloses a desiccant assisted air conditioning apparatus requiring a heat source in a temperature range of 100°–150° C. for regenerating the desiccant (moisture adsorbent), and heat sources such as electric heaters and boilers are primarily utilized. In recent years, desiccants which can be regenerated at lower temperatures in a range of 60°–80° C. have been developed, enabling the use of heat sources operating at lower temperatures.

FIG. 6 is a schematic representation of a typical example of such improved desiccant assisted apparatus, and FIG. 7 is a psychrometric chart showing the operation of this example apparatus. In FIG. 6, the reference numeral 101 refers to a conditioning space; 102 refers to a blower; 103 refers to a desiccant wheel including desiccant material alternatingly communicatable with the process air and regeneration air; 104 refers to a sensible heat exchanger; 105 refers to a humidifier; 106 refers to a water supply pipe for the humidifier; 107–113 refer to air passages for process air; 140 refers to a blower for the regeneration air; 220 refers to a condenser as well as a heat exchanger between refrigerant and regeneration air (heating device); 121 refers to a sensible heat exchanger; 124–130 refer to air passages for regeneration air; 201–204 refer to cooling refrigerant passages. 240 refers to an evaporator for working as a heat exchanger between refrigerant and process air (cooling device). In FIG. 6, circled letters K–V represent the thermodynamic state of the air medium being processed to correspond to respective sites shown in FIG. 9. SA designates supply air, RA designates return air, OA designates outside air and EX designates exhaust air.

The operation of such an apparatus will be explained in the following. In FIG. 6, the ambient air from the room 101 to be conditioned (process air) is drawn through a passage 107 into a blower 102 to be pressurized and is forwarded to a desiccant wheel 103 through a passage 108. In the desiccant wheel 103, the humidity ratio of the ambient air is lowered by the removal of moisture from the ambient air to the moisture adsorbent in the desiccant wheel 103. During the process of adsorption, the heat of adsorption is released into the process air which rises in temperature. The process air with a warmer temperature and a lower humidity is forwarded through the passage 109 to the sensible heat exchanger 104, and is cooled by heat exchange with outside air (regeneration air). Then the cooled air is forwarded to a evaporator 240 to be further cooled through a refrigeration process and is forwarded to a humidifier 105 through a passage 110 to be cooled by water spraying or evaporative humidification in an isenthalpic process and is returned to the conditioning room 101 through a passage 113.

The desiccant material adsorbed moisture during this process and needs to be regenerated. In this example, this is performed as follows. Outside air (regeneration air) OA is drawn into the blower 140 through a passage 124 to be pressurized and forwarded to the sensible heat exchanger

2

104, cools the process air and in the process raises its own temperature. The warm air OA flows into a next sensible heat exchanger 121 through a passage 125 and raises its temperature by heat exchange with the spent high temperature regeneration air after regeneration. The regeneration air from the heat exchanger 121 flows into a condenser 220 through a passage 126 so that it is heated by heat of condensation of the refrigerating machine to raise its temperature to a range of 60°–80° C., and its relative humidity is lowered. The regeneration air with a lowered humidity passes through the desiccant wheel 103 to remove the moisture from the desiccant wheel. Spent air from the desiccant 103 flows through a passage 128 to enter the sensible heat exchanger 121 to preheat the regeneration air prior to regeneration, and flows through a passage 130 to be exhausted externally.

The above process can be explained with reference to the psychrometric chart shown in FIG. 7. The ambient air in room 101 to be air conditioned (process air: state K) is drawn into the blower 102 through the passage 107 to be pressurized, and flows through the passage 108 to reach the desiccant wheel 103 so that its humidity ratio will be lowered by adsorption of moisture to the moisture adsorbent in the desiccant wheel while its temperature rises (state L) by the heat of adsorption. The air with a lower humidity and a higher temperature flows through the passage 109 to reach the sensible heat exchanger 104, and is cooled by heat exchange with the regeneration air (state M). The cooled air flows through the passage 110 to reach the evaporator 240 to be further cooled through a refrigeration process (state N) and is forwarded to a humidifier 105 so that its temperature is lowered in an isenthalpic manner by water spraying or evaporative humidification (state P), and is returned through the passage 111 to the conditioning space 101. In the above manner, an enthalpy difference is produced between return air (state K) in the room and supply air (state P) for use for cooling of the conditioning space 101.

The desiccant is regenerated as follows. Outside air (OA: state Q) is drawn through the passage 124 into the blower 140, is pressurized, forwarded to the sensible heat exchanger 104, cools the process air and raises its own temperature (state R), flows into the passage 125 and the next heat sensible exchanger 121, exchanges heat with the spent high temperature air so that its own temperature rises (state S). Regeneration air from the sensible heat exchanger 121 flows through the passage 126 to reach the condenser 220 and is heated by the heat of condensation of the refrigerating machine to a temperature between 60°–80° C., so that its relative humidity is lowered (state T). The regeneration air having a lowered humidity flows through the desiccant wheel 103 thereby removing adsorbed moisture (state U). Spent outgoing air from the desiccant wheel 103 flows through the passage 129 to reach the sensible heat exchanger 121 to preheat the regeneration air prior to regeneration process, and lowers its own temperature (state V) and flows into the passage 130 to be exhausted out as waste air. The processes of regeneration of desiccant and dehumidification and cooling of the ambient air described above is repeatedly performed to provide the desiccant assisted air conditioning process.

The conventional desiccant assisted air conditioning system referred to in FIG. 7 presents an operational problem that, in paired cycles of condensation and evaporation processes, the condensation temperature must be higher than the temperature of regeneration air at state T, and that the evaporation temperature must be lower than the temperature of the process air at state N, with a results that the compression ratio of the compressor must be large enough to generate a large ΔT representing the temperature difference between the states T and N. For desiccant assisted air conditioning systems, the temperature difference between the regeneration air and process air is larger than that required for household air conditioning systems, and commonly available compressors could not be used for such purpose, necessitating the use of specially designed devices. The cost of manufacturing is thus increased, and the power for operating at a large compression ratio is also increased, and these problems resulted in an air conditioning system of high operating cost.

SUMMARY OF THE INVENTION

It is an object of the present invention to provide a highly reliable air conditioning system which can be operated by commonly available compressors and produce a higher energy utilization efficiency in desiccant assisted air conditioning process while offering an economical cost of purchase as well as operation.

The above object has been accomplished by a desiccant assisted air conditioning system comprising: a process air passage for flowing process air; a regeneration air passage for flowing regeneration air; a desiccant device which can be selectively communicated with either the process air passage or the regeneration air passage; and a plurality of vapor compression refrigeration circulation units, each unit having a compressor, an evaporator and a condenser; the condensers being disposed upstream of the desiccant device in the regeneration air passage so as to be heat-exchangeable with the regeneration air, and the evaporators being disposed downstream of the desiccant device in the process air passage so as to be heat-exchangeable with the process air, so that the heat of condensation in the refrigeration circulation units can be utilized as a heating source for regenerating a desiccant material in the desiccant device, and so that the heat of evaporation in the refrigeration circulation units can be utilized as a cooling source for cooling process air, wherein the circulation units are arranged so that the evaporators and the condensers are disposed in a last-come-first manner in relation to an order within the respective air passages.

A phrase "a last-come-first manner" means that if two of the refrigeration circulation units are provided and the first condenser is disposed downstream of the second condenser in the regeneration air passage, then the first evaporator is disposed upstream of the second evaporator in the process air passage.

By such construction, the temperature difference between the evaporation temperature and the condensation temperature necessary to operate both the first circulation unit and the second circulation unit, which leads to reduction of compression ratios of the compressors for both circulation units, which means that ordinary compressors used for household uses can be utilized, as well as reduction of drive power for the compressors, thus enabling to present a highly reliable desiccant assisted air conditioning system with a low manufacturing cost and a high energy efficiency.

BRIEF DESCRIPTION OF THE DRAWINGS

FIG. 4 is a psychrometric chart showing the desiccant air conditioning cycle of the second embodiment in case of a normal operational mode.

DESCRIPTION OF THE PREFERRED EMBODIMENTS

A first embodiment will be explained with reference to FIGS. 1–2.

Figure 1:
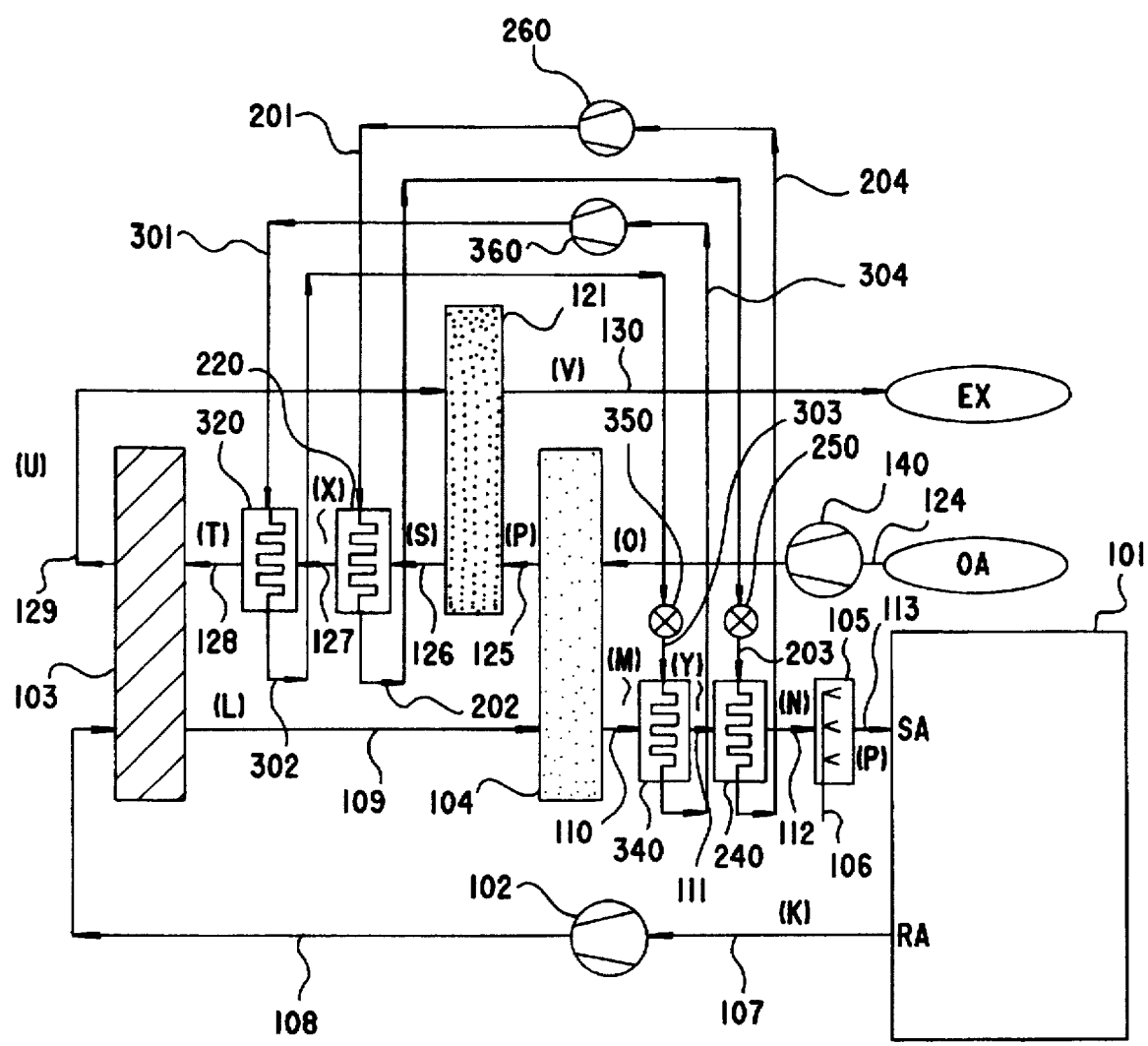
FIG. 1 is a schematic representation of a first embodiment of the desiccant assisted air conditioning apparatus of the present invention.

FIG. 1 is a schematic representation of the first embodiment of the desiccant assisted air conditioning system. The vapor compression heat pump section or the refrigeration section of the system comprises: a first circulation unit, including primarily an evaporator (functioning as cooling device) 340, a condenser (functioning as heating device) 320, a compressor 360 and an expansion valve 350, to perform refrigeration cycles by circulating a refrigerant through passages 301, 302, 303 and 304; and a second circulation unit including primarily an evaporator (functioning as cooling device) 240, condenser (functioning as heating device) 220, a compressor 260 and an expansion valve 250 to perform refrigeration cycles by circulating a refrigerant through the passages 201, 202, 203 and 204. As illustrated in FIG. 1, the heat sources in the first and second circulation units are arranged with respect to the flow direction of the regeneration air such that the condenser (heating device) 320 in the first circulation unit is disposed downstream of the condenser (heating device) 220 of the second circulation unit, along the regeneration air passage of the desiccant assisted air conditioning system. Similarly, the evaporator (cooling device) 340 of the first circulation unit is disposed upstream of the evaporator (cooling device) 240 in the second circulation unit, along the process air passage of the desiccant assisted air conditioning system. In this configuration, the heat of condensation in the first and second circulation units can be used to regenerate the desiccant material, and the heat of evaporation in the first and second circulation units can be utilized as a cooling source to cool the process air directed to the conditioning space.

The air conditioning section of the desiccant assisted air conditioning apparatus shown in FIG. 1 is constructed as follows: the conditioning space 101 is communicated with the intake of the blower 102 through the passage 107; the outlet of the blower 102 is communicated with the desiccant wheel 103 through the passage 108; the discharge for the process air from the desiccant wheel 103 is communicated with the sensible heat exchanger 104 for the regeneration air through the passage 109; the outlet for the process air from the heat exchanger 104 is communicated with the evaporator 340 of the first circulation unit through the passage 110; the outlet for the process air of the evaporator 340 of the second circulation unit is communicated with the inlet for the process air of the evaporator 240 of the second circulation unit through the passage 111; the outlet for the process air of the evaporator 240 of the second circulation unit is communicated with the humidifier 105 through the passage 112; and the outlet for the process air of the humidifier 105 is communicated with the conditioning space 101 through the passage 113; thereby completing a processing cycle for the process air.

In the meanwhile, the processing route for the regeneration air is as follows: outside air is introduced by connecting the intake of the blower 140 through the passage 124; the outlet of the blower 140 is communicated with the sensible heat exchanger 104 heat-exchangeable with the process air; the outlet for the regeneration air from the sensible heat exchanger 104 is communicated with the inlet of the low temperature side of another heat exchanger 121 through a passage 125; the outlet of the low temperature side of the sensible heat exchanger 121 is communicated with the condenser 220 of the second circulation unit through the passage 126; the outlet for the regeneration air of the condenser 220 of the second circulation unit is communicated with the inlet of the regeneration air of the condenser 320 of the first circulation unit through the passage 127; the outlet for the regeneration air of the condenser 320 of the first circulation unit is communicated with the inlet of the regeneration air from the desiccant wheel 103 through the passage 128; the outlet for the regeneration air of the desiccant wheel 103 is connected to the inlet of the high temperature side of the sensible heat exchanger 121 through the passage 129; the outlet of the high temperature side of the sensible heat exchanger 121 is communicated with the external space through the passage 130 so that outside air can be introduced for use as regeneration air. In FIG. 1, the circled alphabetical designations K–V refer to the thermodynamic states of the air corresponding to those in FIG. 2, and SA designates supply air, RA designates return air, OA designates outside air and EX designates exhaust air.

The refrigeration cycle of the vapor compression heat pump section of the above desiccant assisted air conditioning system will be given as follows. The refrigerant in a first cycle acquires latent heat of evaporation from the air in the evaporator 340 to be evaporated, is drawn into the compressor 360 through the passage 304 to be compressed, and is forwarded through the passage 301 to the condenser 320 to be condensed while releasing heat of condensation to regeneration air. The condensed refrigerant reaches to expansion valve 350 via the passage 302 to expand and lower the pressure, then it flows to return to the evaporator 340. In the second cycle of the heat pump, the refrigerant acquires latent heat of evaporation from the air in the evaporator 240 to be evaporated, is drawn into the condenser 260 through the passage 204 to be compressed, and is forwarded through the passage 201 to the condenser 220 to be condensed while releasing heat of condensation to regeneration air. The condensed refrigerant reaches to expansion valve 250 via the passage 202 to expand and lower the pressure, then it flows to return to the evaporator 240.

Next, the operation of an air conditioning apparatus combining the vapor compression heat pump presented above with desiccant assisted air conditioning section will be explained.

Figure 2:
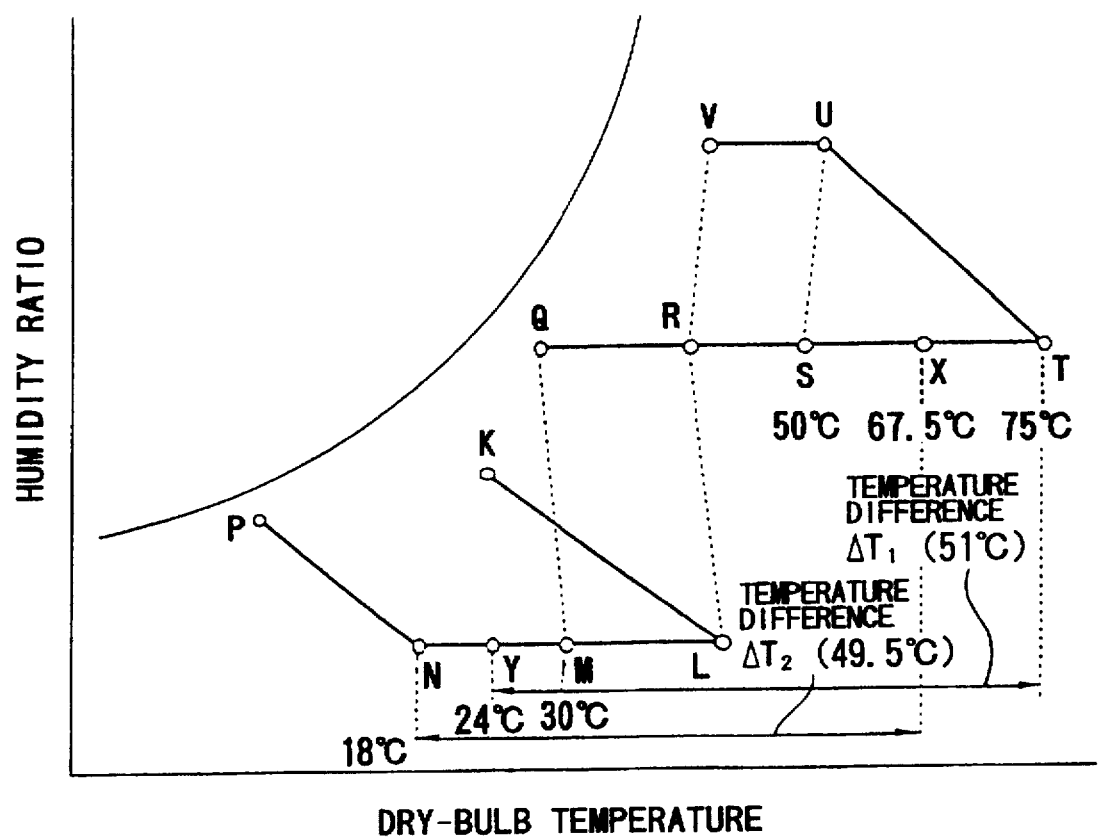
FIG. 2 is a psychrometric chart showing the desiccant air conditioning cycle of the first embodiment.

FIG. 2 is a psychrometric chart showing the operation of this example apparatus. In FIG. 2, the ambient air from the room 101 to be conditioned (process air) is drawn through the passage 107 into the blower 102 to be pressurized and is forwarded to the desiccant wheel 103 through the passage 108. In the desiccant wheel 103, the humidity ratio of the ambient air is lowered by the removal of moisture from the ambient air to the moisture adsorbent. During the process of adsorption, the heat of adsorption is released into the process air which rises in temperature.

The process air with a warmer temperature and a lower humidity is forwarded through the passage 109 to the sensible heat exchanger 104, and is cooled by heat exchange with outside air (regeneration air). Then the cooled air is further cooled by being forwarded to the evaporator 340, the passage 111 and the evaporator 240 in the order.

This process corresponds to the sensible heat change of the process air, and the change of temperature is as large as 10°–15° C., the evaporation temperature of the first cycle is affected by the temperature of process air to be 5°–7° C. higher compared with the evaporation temperature of the second cycle. The cooled process air is forwarded to a humidifier 105 to be cooled by water spraying or evaporative humidification in an isenthalpic process and is returned to the conditioning space 101 through a passage 113.

The desiccant material adsorbed moisture during this process and needs to be regenerated. In this example, this is performed as follows by using outside air as regeneration air. Outside air (regeneration air) OA is drawn into the blower 140 through a passage 124 to be pressurized and forwarded to the sensible heat exchanger 104, cools the process air and in the process raises its own temperature. The warm air OA flows into a next sensible heat exchanger 121 through a passage 125 and raises its temperature by heat exchange with the spent high temperature regeneration air after regeneration. The regeneration air from the heat exchanger 121 flows into a condenser 220, the passage 127 and the condenser 320 in the order to be heated to the temperature of 60°–80° C., and its relative humidity is lowered. This process corresponds to the sensible heat change of the regeneration air, and the change of temperature is as large as 20°–30° C., the condensing temperature of the first cycle is affected by the temperature of regeneration air to be 10°–15° C. lower compared with the condensing temperature of the first cycle. The regeneration air coming out of the condenser 320 with a lowered humidity passes through the desiccant wheel 103 to remove the moisture from the desiccant wheel. Spent air from the desiccant 103 flows through a passage 129 to enter the sensible heat exchanger 121 to preheat the regeneration air prior to regeneration, and flows through a passage 130 to be exhausted externally.

The above process can be explained with reference to the psychrometric chart shown in FIG. 2. The ambient air in room 101 to be air conditioned (process air: state K) is drawn into the blower 102 through the passage 107 to be pressurized, and flows through the passage 108 to reach the desiccant wheel 103 so that its humidity ratio will be lowered by adsorption of moisture to the moisture adsorbent in the desiccant wheel while its temperature rises (state L) by the heat of adsorption. The air with a lower humidity and a higher temperature flows through the passage 109 to reach the sensible heat exchanger 104, and is cooled by heat exchange with the regeneration air (state M). The cooled air flows through the passage 110 to reach the evaporator 340 to be further cooled (state Y). The cooled air flows through the passage 111 to reach the evaporator 240 to be further cooled (state N). The air thus cooled is forwarded to a humidifier 105 through the passage 112 so that its temperature is lowered in an isenthalpic manner by water spraying or evaporative humidification (state P), and is returned through the passage 113 to the conditioning space 101. In the above manner, an enthalpy difference is produced between return air (state K) in the room and supply air (state P) for use for cooling of the conditioning space 101.

The desiccant is regenerated as follows. Outside air (OA: state Q) is drawn through the passage 124 into the blower 140, is pressurized, forwarded to the sensible heat exchanger 104, cools the process air and raises its own temperature (state R), flows into the passage 125 and the next heat sensible exchanger 121, exchanges heat with the spent high temperature air so that its own temperature rises (state S).

Regeneration air from the sensible heat exchanger 121 flows through the passage 126 to reach the condenser 220 and is heated (state X). The heated air coming out of condenser 220 flows through the passage 127 to reach the condenser 320 to be finally heated to a temperature between 60°–80° C., so that its relative humidity is lowered (state T). The regeneration air having a lowered humidity flows through the desiccant wheel 103 thereby removing adsorbed moisture (state U). Spent outgoing air from the desiccant wheel 103 flows through the passage 129 to reach the sensible heat exchanger 121 to preheat the regeneration air prior to regeneration process, and lowers its own temperature (state V) and flows into the passage 130 to be exhausted out as waste air. The processes of regeneration of desiccant and dehumidification and cooling of the ambient air described above is repeatedly performed to provide the desiccant assisted air conditioning process. It is a common practice to utilize exhaust air from the conditioning room as regeneration air, and in this invention also, there is no problem in recycling the exhaust room air for regeneration air, and the same result will be obtained.

Figure 7:
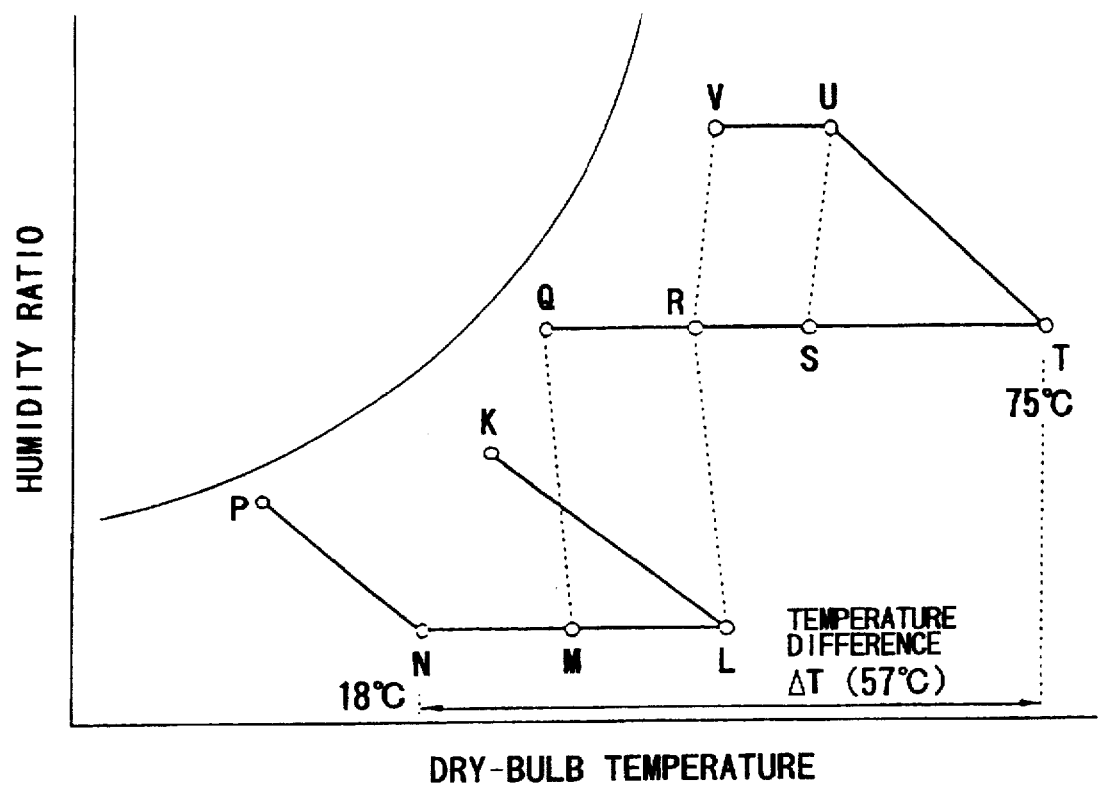
FIG. 7 is a psychrometric chart of the conventional desiccant assisted air conditioning apparatus shown in FIG. 6.

In the desiccant assisted air conditioning system having the configuration described above, the thermal exchange process is completed within the midway of the sensible heat exchange process, the temperature of the process air in contact with the evaporator in the first circulation unit is 5°–7° C. higher compared with the temperature of the process air at the inlet to the humidifier (state N) in the conventional air conditioning system shown in FIG. 7. Further, because the thermal exchange process is completed within the midway of the sensible heat exchange process, the temperature of the regeneration air in contact with the condenser in the second circulation unit is 10°–15° C. lower compared with the temperature of regeneration air at the inlet to the desiccant device (state T) in the conventional air conditioning system.

Therefore, the second circulation unit can be activated at a lower pressure than the first circulation unit, and further, as shown in FIG. 2, the minimum difference $\Delta T1$ between the evaporation temperature and the condensation temperature necessary to operate the first circulation unit is about 6° C. lower than the corresponding difference $\Delta T$ for the conventional system shown in FIG. 7. Similarly, the minimum difference $\Delta T2$ between the evaporation temperature and the condensation temperature necessary to operate the second circulation unit is about 7.5° C. lower than the corresponding difference $\Delta T$ for the conventional system shown in FIG. 7. It follows that the compression ratios of the compressors are lowered in both circulation units, which means that ordinary compressors used for household uses can be utilized in the present system, and that the drive power for the compressors is reduced by about 10–13%, thus leading to energy conservation.

Figure 3:
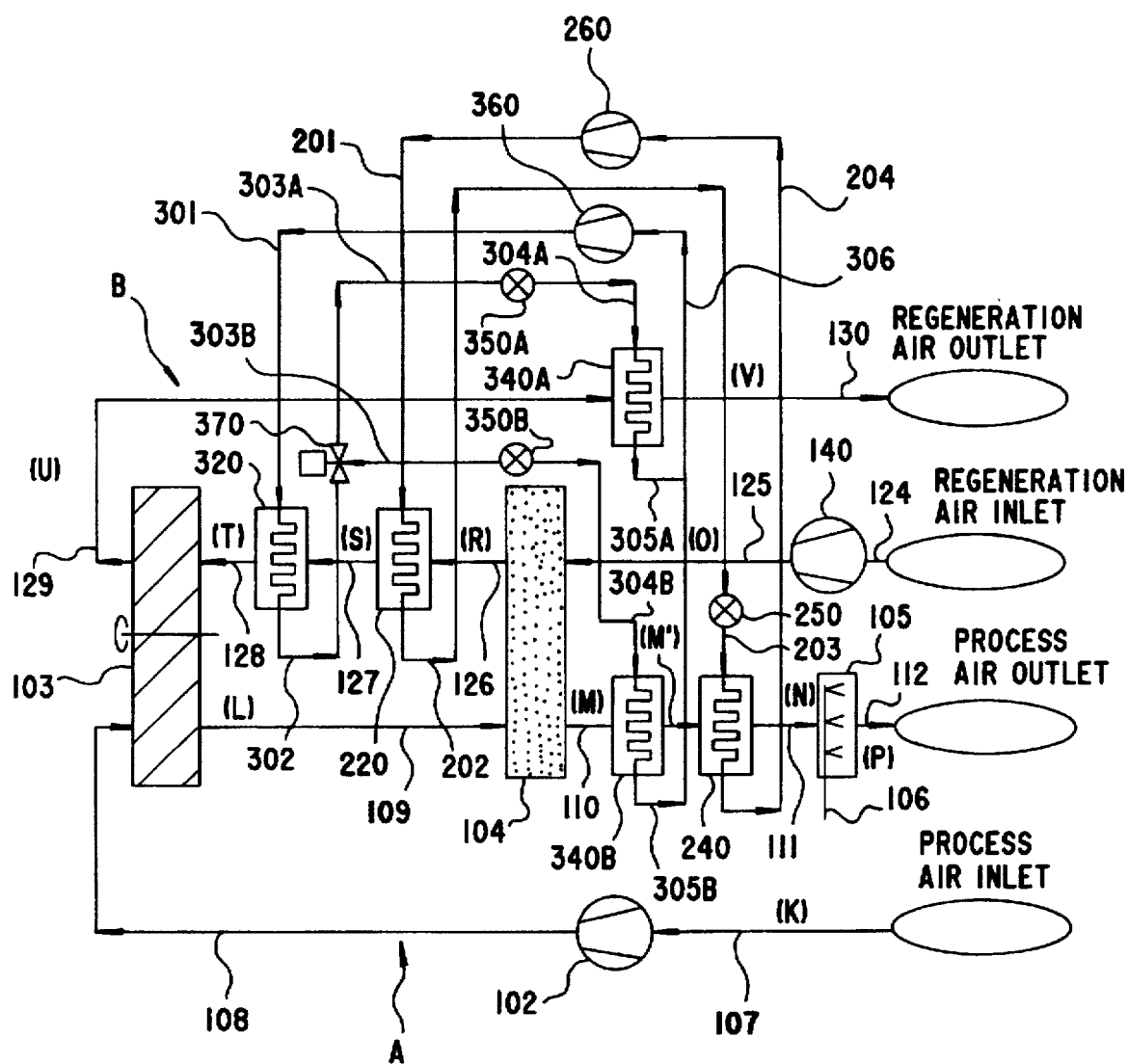
FIG. 3 is a schematic representation of a second embodiment of the desiccant assisted air conditioning apparatus of the present invention.

FIG. 3 is a schematic representation of the basic configuration of a second embodiment. In the configuration of the first embodiment shown in FIG. 1, if the system has not been operated for some period of time, the desiccant material naturally adsorbs moisture from the environment, and there may be some loss of adsorbing ability of the desiccant material. In such a case, the desiccant does not adsorb sufficient moisture during the initial phase of the system operation, and the temperature of the outgoing air from the desiccant device does not rise very much. For this reason, the temperature difference between the process air and the regeneration air in the sensible heat exchanger 104 is small, and less heat is exchanged. Therefore, the regeneration air cannot be heated sufficiently, and the inlet temperature of the regeneration air at the heat source 220 of the heat pump device is also low. Operation of the heat pump device under such a condition will result in insufficient heating of the regeneration air, and because the adsorption capacity of the desiccant material cannot be recovered quickly, full operation of the overall system is also delayed. The second embodiment will address such a concern.

As in the first embodiment, the second embodiment system is also based on two heat pump devices as heat sources. In this embodiment comprises two evaporators 340A, 340B operably selectable by a switching valve 370, and a condenser 320 in the first circulation unit. These two evaporators are arranged so that evaporator 340A exchanges heat with post-desiccant regeneration air and evaporator 340B exchanges heat with post-desiccant process air. In this embodiment, the sensible heat exchanger 121 which was used in the first embodiment, for recovering heat possessed by the post-desiccant regeneration air to the pre-desiccant regeneration air, is not provided.

The operation of the second embodiment system will be explained. During the normal mode of operation, the switching valve 370 is at a position for communicating the passage 302 with the passage 303B so that the evaporator 340B is in operation for heat exchange with post-desiccant process air. Psychrometric chart for the normal operation mode of the desiccant assisted air conditioning system will be explained with reference to FIG. 4.

The ambient air in room 101 to be air conditioned (process air: state K) is drawn into the blower 102 through the passage 107 to be pressurized, and flows through the passage 108 to reach the desiccant wheel 103 so that its humidity ratio will be lowered by adsorption of moisture to the moisture adsorbent in the desiccant wheel while its temperature rises (state L) by the heat of adsorption. The air with a lower humidity and a higher temperature flows through the passage 109 to reach the sensible heat exchanger 104, and is cooled by heat exchange with the regeneration air (state M). The cooled air flows through the passage 110 to reach the evaporator 340B of the first circulation unit to be cooled (state M'), then flows to the evaporator 240 of the second circulation unit to be further cooled (state N). The air thus cooled is forwarded to a humidifier 105 through the passage 111 so that its temperature is lowered in an isenthalpic manner by water spraying or evaporative humidification (state P), and is returned through the passage 112 to the conditioning space 101.

The desiccant is regenerated as follows by using outside air as regeneration air. Outside air (OA: state Q) is drawn through the passage 124 into the blower 140, is pressurized, forwarded to the sensible heat exchanger 104, cools the process air and raises its own temperature (state R), flows into the condenser 220 of the second heat pump through passage 126 to be heated by the heat pumped up from the evaporator 240 to raise its temperature (state S). Regeneration air from the condenser 220 flows through the passage 127 to reach the condenser 320 of the first heat pump and is finally heated to a temperature between 60°–80° C. (state T) so that its relative humidity is lowered. The regeneration air having a lowered humidity flows through the desiccant wheel 103 thereby removing adsorbed moisture (state U). Spent outgoing air from the desiccant wheel 103 flows through the passage 129 to reach the evaporator 340A, which is not operating because of the position of the switching valve 370, without temperature change and flows into the passage 130 to be exhausted.

When the adsorption ability of the desiccant material is low because, for example, desiccant material had naturally adsorbed moisture from the environment due to a long time off operation, the system is operated by switching the switching valve so as to communicate the passage 302 with the passage 303A. This regeneration preferred operation mode presents the same cycle for the second circulation unit in the vapor compression refrigeration cycle as the predescribed embodiment, and the cycle for the first circulation unit is as follows.

The refrigerant acquires latent heat of evaporation from the regeneration air coming out of the desiccant 103 in the evaporator 340A to be evaporated, is drawn into the compressor 360 through the passage 304A to be compressed, and is forwarded through the passage 301 to the condenser 320 to be condensed while releasing heat of condensation to regeneration air prior to entering the desiccant 103. The condensed refrigerant reaches to expansion valve 350A via the passage 302 to expand and lower the pressure, then it flows to return to the evaporator 340A.

Figure 5:
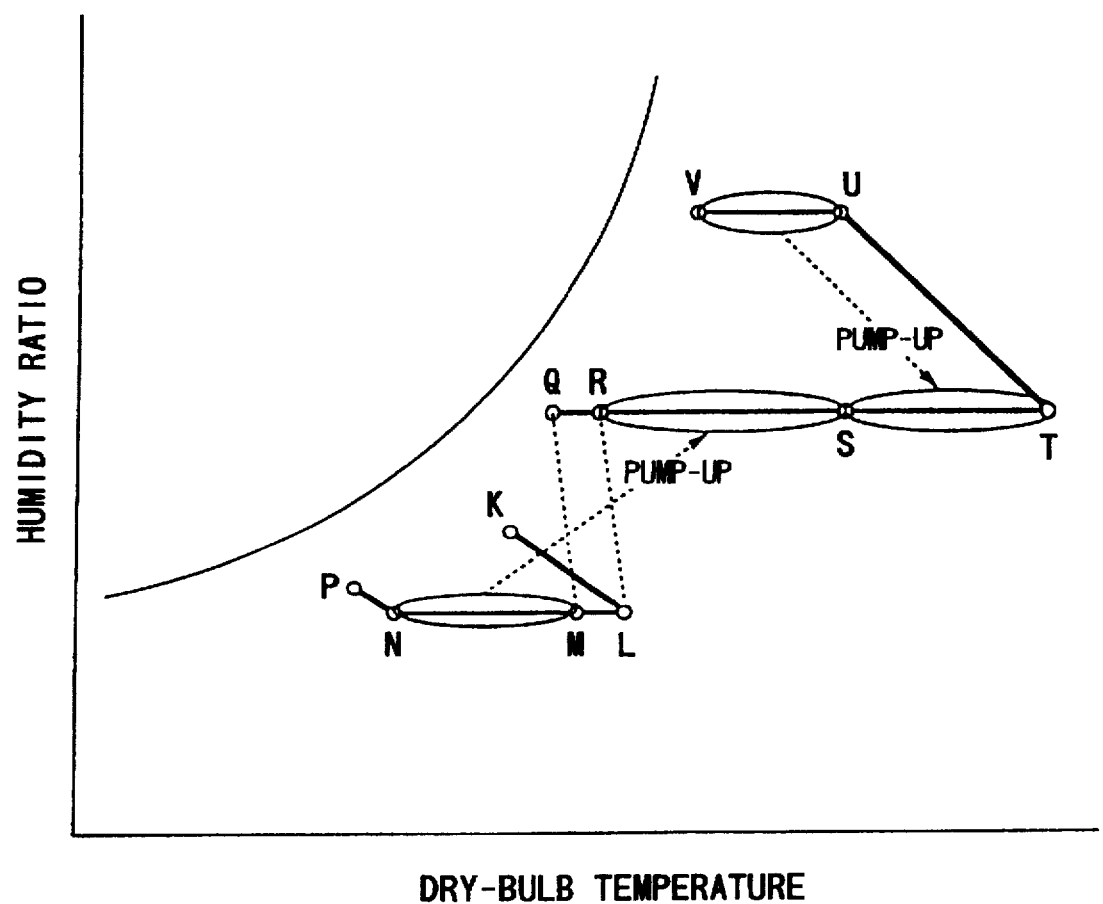
FIG. 5 is a psychrometric chart showing the desiccant air conditioning cycle of the second embodiment in case of a regeneration preferred operational mode.
Figure 6:
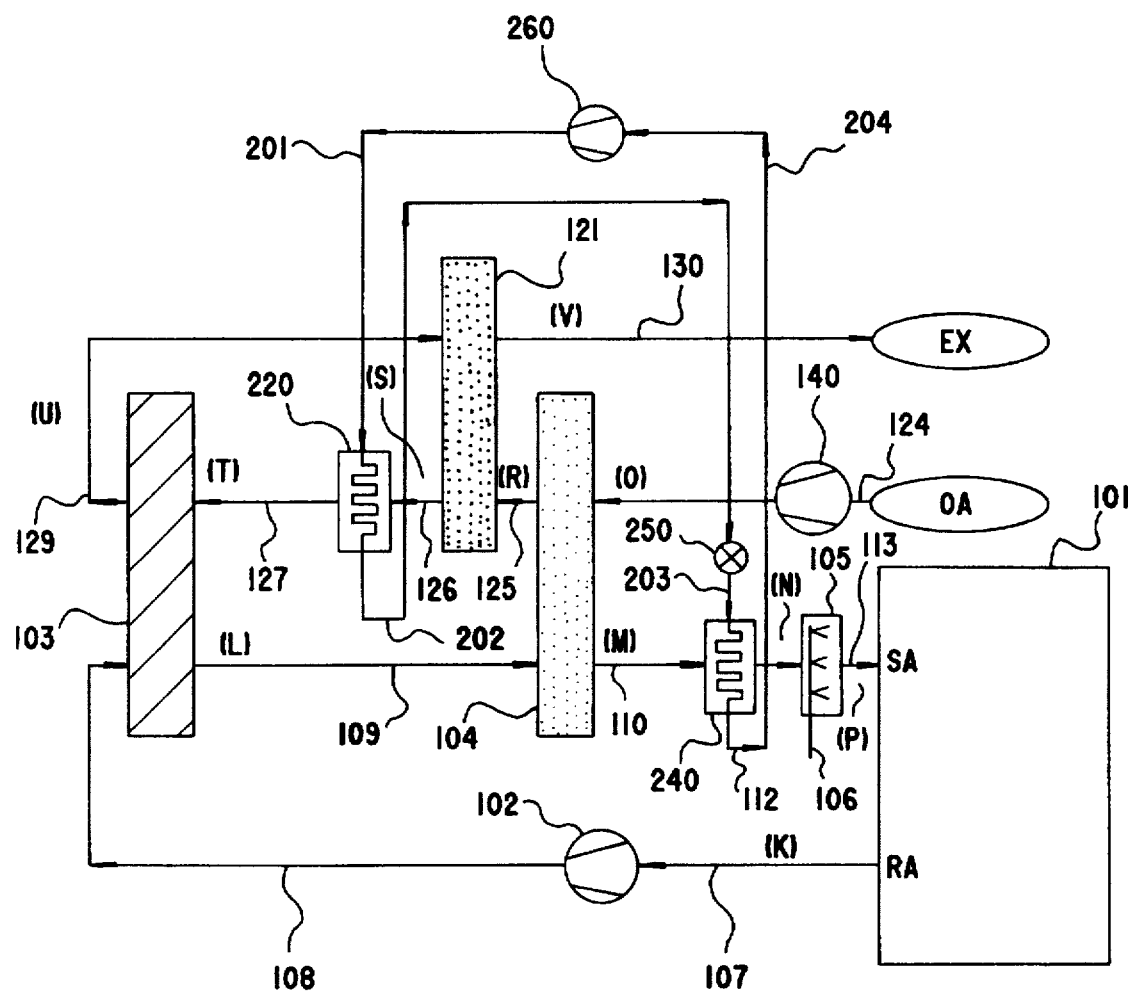
FIG. 6 is a schematic representation of a conventional desiccant assisted air conditioning apparatus.

Next, the operation of an air conditioning apparatus presented above combining the vapor compression heat pump with desiccant assisted air conditioning section will be explained, referring to FIG. 5, which is a psychrometric chart showing the operation of this example apparatus.

The ambient air to be returned (process air: state K) is drawn into the blower 102 through the passage 107 to be pressurized, and flows through the passage 108 to reach the desiccant wheel 103 so that its humidity ratio will be lowered by adsorption of moisture to the moisture adsorbent in the desiccant wheel while its temperature rises (state L) by the heat of adsorption. The air with a lower humidity and a higher temperature flows through the passage 109 to reach the sensible heat exchanger 104, and is cooled by heat exchange with the regeneration air (state M). The cooled air flows through the passage 110 to reach the evaporator 240 to be cooled (state M). The cooled air is forwarded to a humidifier 105 so that its temperature is lowered in an isenthalpic manner by water spraying or evaporative humidification (state P), and is returned through the passage 112 to the conditioning space 101.

The desiccant which had adsorbed moisture need regeneration, which is performed by using outside air as regeneration air as follows. Outside air (state Q) is drawn through the passage 124 into the blower 140, is pressurized, forwarded to the sensible heat exchanger 104, cools the process air and raises its own temperature (state R), flows into the passage 126 to reach the condenser 220 and is heated by the second heat pump to have another temperature rise. Regeneration air coming out of the condenser 220 is forwarded to condenser 320 through passage 127 to be by the first heat pump to a final temperature between 60°–80° C., so that its relative humidity is lowered (state T). The regeneration air having a lowered humidity flows through the desiccant wheel 103 thereby removing adsorbed moisture (state U). Spent outgoing air from the desiccant wheel 103 flows through the passage 129 to reach the evaporator 340A through passage 129 to be cooled by heat recovery by the first heat pump (state V) and flows into the passage 130 to be exhausted out as waste air.

During the start-up phase of the operation of the desiccant assisted air conditioning system, in the second circulation unit, the sensible heat recovered from the post-desiccant process air is utilized to heat the pre-desiccant regeneration air (state R–S), while in the first circulation unit, predesiccant regeneration air is heated (state S–T) by the heat recovered from the post-desiccant regeneration air through the evaporator, which is heat-exchangeable with the post-desiccant regeneration air. Thus, the regeneration air can be heated to the state T at the inlet of the desiccant device 103 even when the desiccant is yet to develop its full adsorption capacity and the temperature of the regeneration air from the sensible heat exchanger 104 is low so that the state R and state Q are very close to each other during the start-up phase. By having a higher temperature at the inlet to the desiccant device 103, the regeneration capacity of the desiccant device 103 is recovered quickly during the start-up phase of the operation so that the normal mode of operation of the system can be attained quickly. The result is an air conditioning system having superior start-up characteristics.

After the initial mode of operation is completed and the adsorption capacity of the desiccant device 103 has been fully recovered, the system may be switched over to the normal mode or the heat pump in the first circulation unit may be shut off. It should be mentioned that, the reason for placing the condenser 320 in the first circulation unit downstream of the condenser 220 of the second circulation unit in the regeneration air passage, is that the temperature difference between the condenser 220 and the evaporator 240 does not change even when the heat pump device in the first circulation unit is shut off. This arrangement allows the compression ratio in the system to remain unchanged so that the second circulation unit, including the second compressor, can be operated under stable conditions.

What is claimed is:

1. A desiccant assisted air conditioning system comprising:

a process air passage for flowing process air;

a regeneration air passage for flowing regeneration air;

a desiccant device which can be selectively communicated with either said process air passage or said regeneration air passage; and a plurality of vapor compression refrigeration circulation units, each unit having a compressor, an evaporator and a condenser; said condensers being disposed upstream of said desiccant device in said regeneration air passage so as to be heat-exchangeable with said regeneration air, and said evaporators being disposed downstream of said desiccant device in said process air passage so as to be heat-exchangeable with said process air, so that the heat of condensation in said refrigeration circulation units can be utilized as a heating source for regenerating a desiccant material in said desiccant device, and so that the heat of evaporation in said refrigeration circulation units can be utilized as a cooling source for cooling process air, wherein said circulation units are arranged so that said evaporators and said condensers are disposed in a last-come-first manner in relation to an order within the respective air passages.

2. A desiccant assisted air conditioning system as claimed in claim 1, comprising two of said refrigeration circulation units.

3. A desiccant assisted air conditioning system as claimed in claim 1, further comprising a sensible heat exchanger for exchanging sensible heat between regeneration air flowing in an upstream side of said condenser in said regeneration air passage and process air flowing upstream of said evaporator in said process air passage.

4. A desiccant assisted air conditioning system as claimed in claim 1, further comprising a sensible heat exchanger for exchanging heat between regeneration air flowing in an upstream side of said condenser in said regeneration air passage and regeneration air flowing in a downstream side of said desiccant device in said regeneration air passage.

5. A desiccant assisted air conditioning system as claimed in claim 1, wherein said plurality of refrigeration units are disposed so that condensers of those units operating at lower pressures are placed progressively further upstream in said regeneration air passage.

6. A desiccant assisted air conditioning system as claimed in claim 1, further comprising: a heat recovery evaporator in at least one of said refrigeration units, said heat recovery evaporator being heat-exchangeable with said regeneration air and disposed downstream of said desiccant device in said regeneration air passage; and a switching valve for selectively communicating a refrigerant passage with either said evaporator in said process air passage or said heat recovery evaporator in said regeneration air passage.

7. A desiccant assisted air conditioning system comprising:

a process air passage for flowing process air;

a regeneration air passage for flowing regeneration air;

a desiccant device which can be selectively communicated with either said process air passage or said regeneration air passage; and a plurality of vapor compression refrigeration circulation units, each unit having a compressor, an evaporator and a condenser; said condensers being disposed upstream of said desiccant device in said regeneration air passage so as to be heat-exchangeable with said regeneration air, and said evaporators being disposed downstream of said desiccant device in said process air passage so as to be heat-exchangeable with said process air, so that the heat of condensation in said refrigeration circulation units can be utilized as a heating source for regenerating a desiccant material in said desiccant device, and so that the heat of evaporation in said refrigeration circulation units can be utilized as a cooling source for cooling process air, wherein said plurality of refrigeration units are disposed so that condensers of those units operating at lower pressures are placed progressively further upstream in said regeneration air passage.

8. A desiccant assisted air conditioning system comprising:

a process air passage for flowing process air, a regeneration air passage for flowing regeneration air, a desiccant device which can be selectively communicated with either said process air passage or said regeneration air passage, a first vapor compression refrigeration circulation unit having a first compressor, a first evaporator and a first condenser, and a second vapor compression refrigeration circulation unit having a second compressor, a second evaporator and a second condenser, said first and second condensers being disposed upstream of said desiccant device in said regeneration air passage so as to be heat-exchangeable with said regeneration air, and said first and second evaporators being disposed downstream of said desiccant device in said process air passage so as to be heat-exchangeable with said process air, so that the heat of condensation in said refrigeration circulation units can be utilized as a heating source for regenerating a desiccant material in said desiccant device, and so that the heat of evaporation in said refrigeration circulation units can be utilized as a cooling source for cooling process air, wherein said first and second circulation units are arranged so that said first condenser is disposed downstream of said second condenser in said regeneration air passage and said first evaporator is disposed upstream of said second evaporator in said process air passage.

* * * * *

UNITED STATES PATENT AND TRADEMARK OFFICE
CERTIFICATE OF CORRECTION

PATENT NO. : 5,761,923
DATED : June 9, 1998
INVENTOR(S) : Maeda

It is certified that error appears in the above-identified patent and that said Letters Patent is hereby corrected as shown below:

Col. 11, line 2, between "refrigeration" and "units", insert --circulation--.

Col. 11, line 8, between "refrigeration" and "units", insert --circulation--.

Col. 12, line 1, between "refrigeration" and "units", insert --circulation--.

Col. 12, line 30, , between "second" and "circulation", insert --refrigeration--.

Signed and Sealed this

Thirtieth Day of March, 1999

Attest:

Q. TODD DICKINSON

*Attesting Officer*  *Acting Commissioner of Patents and Trademarks*